(12) United States Patent
Barry

(10) Patent No.: US 8,730,009 B2
(45) Date of Patent: May 20, 2014

(54) SMART CARD AND MOBILE COMMUNICATION DEVICE COMPRISING THE SMART CARD

(75) Inventor: Aguibou Mountaga Barry, Maaastricht (NL)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 12/842,715

(22) Filed: Jul. 23, 2010

(65) Prior Publication Data

US 2011/0298585 A1 Dec. 8, 2011

(30) Foreign Application Priority Data

Jun. 8, 2010 (EP) .................................... 10165252

(51) Int. Cl.
*G05B 19/00* (2006.01)

(52) U.S. Cl.
USPC ...................................... 340/5.84; 340/384.73

(58) Field of Classification Search
USPC ..................... 340/10.1, 13.26, 5.84, 384.73; 709/200.1
See application file for complete search history.

(56) References Cited

U.S. PATENT DOCUMENTS

| | | | | |
|---|---|---|---|---|
| 3,736,555 A * | 5/1973 | Barrow | ......................... | 367/141 |
| 4,559,418 A * | 12/1985 | Imai | ............................... | 381/113 |
| 4,677,657 A * | 6/1987 | Nagata et al. | ................. | 455/558 |
| 4,851,654 A * | 7/1989 | Nitta | ............................... | 235/492 |
| 5,604,787 A * | 2/1997 | Kotzin et al. | ................. | 455/558 |
| 5,731,535 A * | 3/1998 | Hudak | ............................... | 84/733 |
| 5,938,726 A * | 8/1999 | Reber et al. | .................... | 709/217 |
| 6,247,644 B1 * | 6/2001 | Horne et al. | .................. | 235/380 |
| 6,360,109 B1 * | 3/2002 | Thauvin et al. | ............... | 455/564 |
| 6,784,797 B2 * | 8/2004 | Smith et al. | ................. | 340/573.4 |
| 6,922,780 B1 * | 7/2005 | Siegel | ........................... | 713/189 |
| 7,280,970 B2 * | 10/2007 | Tamir et al. | .................... | 704/273 |
| 7,334,735 B1 * | 2/2008 | Antebi et al. | ................. | 235/492 |
| 7,480,692 B2 * | 1/2009 | Atsmon et al. | ................ | 709/200 |
| 7,627,647 B2 * | 12/2009 | Takayama et al. | ............ | 709/217 |
| 7,866,550 B2 * | 1/2011 | Clegg et al. | .................... | 235/380 |
| 7,941,480 B2 * | 5/2011 | Atsmon et al. | ................ | 709/202 |
| 8,019,609 B2 * | 9/2011 | Tamir et al. | .................... | 704/273 |
| 8,276,809 B2 * | 10/2012 | Hugot et al. | .................... | 235/375 |
| 2002/0118616 A1 * | 8/2002 | Fujiwara et al. | ............ | 369/47.29 |
| 2002/0169608 A1 * | 11/2002 | Tamir et al. | .................... | 704/246 |
| 2003/0226041 A1 * | 12/2003 | Palmer et al. | ................. | 713/202 |
| 2003/0229499 A1 * | 12/2003 | Von Bosse et al. | ........... | 704/275 |
| 2004/0124246 A1 * | 7/2004 | Allen et al. | .................... | 235/492 |
| 2004/0220807 A9 * | 11/2004 | Tamir et al. | .................... | 704/246 |
| 2005/0138390 A1 * | 6/2005 | Adams et al. | ................. | 713/185 |
| 2005/0177661 A1 * | 8/2005 | Loo | ................................... | 710/72 |
| 2006/0136544 A1 * | 6/2006 | Atsmon et al. | ................ | 709/200 |
| 2007/0041371 A1 * | 2/2007 | Hattori | ......................... | 370/352 |
| 2007/0043887 A1 * | 2/2007 | Wang et al. | ..................... | 710/62 |
| 2009/0050693 A1 * | 2/2009 | Clegg et al. | .................... | 235/380 |
| 2013/0043988 A1 * | 2/2013 | Bruno | ........................ | 340/407.1 |

* cited by examiner

*Primary Examiner* — Jennifer Mehmood
*Assistant Examiner* — Rufus Point
(74) *Attorney, Agent, or Firm* — International IP Law Group, PLLC

(57) ABSTRACT

There provided an exemplary smart card. The exemplary smart card comprises a microphone for capturing an audio signal. The exemplary smart card also comprises at least one processor for processing the audio signal.

15 Claims, 1 Drawing Sheet

SMART CARD AND MOBILE COMMUNICATION DEVICE COMPRISING THE SMART CARD

CROSS REFERENCE TO RELATED APPLICATION

This application claims priority to European (EP) Patent Application No. 10 165 252.7, filed on Jun. 8, 2010, the contents of which are incorporated by reference as if set forth in their entirety herein.

BACKGROUND

Usually, electronic devices, such as, for example, mobile communication devices, dispose of a user interface including peripheral devices through which user inputs are made. Such peripheral devices include keypads for entering characters and numbers and microphones for acoustic input. Also, security related inputs are made using these devices, such as inputs for user authentication and further sensitive inputs which are to be protected from unauthorized access by third parties.

A conventional and widely applied method for authenticating a user includes the verification of a password or personal identification number (PIN) which the user enters using a keypad and which is validated in a user device. In particular, the validation may be made in a secure smart card, which is inserted into the user device. Such a smart-card-based user authentication is made, for example, in mobile communication devices, which usually dispose of a smart card, such as, for example, a so called SIM card, that provides functionality for identifying and/or authenticating the user towards a mobile communication network and that itself authenticates the user using a PIN.

It is one problem of the aforementioned user authentication procedure that the transmission of the secure password or PIN from the peripheral keypad to the smart card bears the risk to be put a trace on or to be otherwise tampered with. In addition, there is the risk that an unauthorized third party spies out the password or PIN and gains access to the device and/or a service relying on such authentication procedure in place of the authorized user. Furthermore, the user could also provide the password or PIN to a third person by choice in order to allow the third person to gain access. Thus, in other words, a successful verification of the entered password or PIN does not guarantee that the input thereof has been made by the authorized user.

DE 103 53 068 A1 describes a method for authenticating a user of a mobile phone on the basis of her voice profile. In this method, the voice of the user is captured by a microphone of the mobile phone and the voice recording is transmitted to a service, which authenticates the user by checking the voice sample. A corresponding control program may be stored in the SIM card of the mobile phone.

It is known that the voice is a unique biometric feature of the user. A speech-based user authentication has the advantage that it requires a voice recording of the user authorized in order to be successful, while voice samples spoken by a third person will not allow for a successful user authentication. However, there is still the problem that a peripheral microphone is used for the voice input which could be put a trace on or which could be otherwise tampered with. This problem is not limited to voice inputs used for authenticating the user, but also appears in connection with other voice inputs which are made using the microphone.

SUMMARY

An exemplary embodiment of the invention relates to a smart card, particularly to a smart card for use in a mobile communication device. Furthermore, a mobile communication device may comprise the smart card.

Therefore, it is an object of the present invention to allow for secure user inputs, particularly in a device comprising a smart card.

A smart card according to an exemplary embodiment may comprise a microphone for capturing an audio signal and at least one processor for processing the audio signal. Here, the term microphone is to be understood in its broadest sense and includes any sensor for measuring or acquiring acoustic signals.

A smart card according to an exemplary embodiment may provide an advantage that a microphone for capturing the audio signal is included in the smart card. Moreover, the smart card may include a processor configured to process the captured audio signal. Hereby, the audio signal does not have to be captured using a potentially unsecure peripheral or external microphone so that tampering of the audio signal is prevented.

In one exemplary embodiment of the invention, the microphone is non-detachably connected to the smart card. In particular, the microphone is connected to the smart card in such a way that the connection cannot be reestablished without further means when it has been interrupted to detach the microphone from the smart card. This has the advantage that the integrated microphone cannot be replaced by another microphone with fraudulent intent. Preferably, the connection is irreversibly destroyed when detaching the microphone.

One exemplary embodiment of the invention provides that the microphone is embedded into a body of the smartcard. Hereby, it can be significantly hindered that the microphone is detached from the microphone without irreversibly destroying the connection between the microphone and the smart card.

In one exemplary embodiment of the invention, the processor may be configured to recognize a user using a voice sample of the user captured by the microphone. Hereby, the smart card is enabled to perform a secure voice-based user authentication. Such user authentication can be applied for various purposes. In particular, a function of the smart card or a device connected to the smart card can be unlocked in response to the successful user authentication, or the smart card can provide the result of the user authentication to a further entity, thereby allowing this entity to rely on the secure user authentication in the smart card.

In an exemplary embodiment of the invention, the processor is configured to compare the captured audio signal to reference information stored therein. In particular, the reference information is configured as a so-called voice print of the user. The reference information may be generated in the smart card based on a voice sample of the user captured using the smart card's microphone. This has the advantage that the reference information can be generated without a further device. However, as an alternative, the reference information may be generated externally to the smart card and transmitted to the smart card for being stored therein.

In another exemplary embodiment of the invention, the processor is configured to determine that an audio input captured using the microphone corresponds to a predetermined command and to control an activation of a function assigned to the predetermined command. Hereby, the smart card allows activating functions by voice input. Thus, functions can be activated, when no other input device, such as, for example, a keypad, is present. Furthermore, functions can be activated in a secure way without having to rely on a potentially unsecure peripheral input device, even if such input device is available. In addition, activation by voice is more convenient for the user. The function which is activated may be a function provided by the smart card or by an external device. In the latter case, the smart interacts with the external device to activate the function in response to the captured audio input.

One exemplary embodiment provides that the command is included in a set of predetermined commands stored in the smart card. The set of commands may correspond to a dictionary with which the audio input may be compared in order to facilitate the recognition of the command.

Furthermore, in one exemplary embodiment of the invention, the processor is configured to forward the audio signal to a receiver external to the smart card. Advantageously, this exemplary embodiment allows using the audio signal captured using the smart card's microphone in an external device. Also, it is made possible to establish a communication between the user of the smart card and a communication partner to which the audio signal is delivered.

In another exemplary embodiment of the invention, the processor is configured to encrypt the audio signal before it is forwarded. In this way, it can be ensured that no tampered audio signal is provided to the external receiver. In particular, a secure communication with a communication partner can be established, when the audio signal is encrypted in the smart card.

In one exemplary embodiment, the smart card comprises a microprocessor for executing functions other than processing the audio signal and the processor is configured as a hardware module separate from the microprocessor. The microprocessor may be integrated into an integrated circuit of the smart card and may be programmed to provide a "conventional" function of the smart card, which may include the execution of certain transaction in interaction with another entity. Such transactions may include financial transaction, the provision of identification and/or authentication data stored in the smart card to the entity, or the provision of further data securely stored in the smart card. It is an advantage of the aforementioned embodiment that the separate hardware module can be adapted to the processing of the audio signal and unloads the microprocessor from this task.

Moreover, in one exemplary embodiment of the invention, the smart card comprises at least two processors for processing the audio signal, each processor being configured as a separate hardware module. Hereby, adapted hardware modules can be provided for the different tasks and the execution of the different tasks can be distributed among the hardware modules. Here, each processor may provide one of the aforementioned functions including user authentication, command recognition and forwarding of the captured audio signal.

In one exemplary embodiment, the smart card is configured for use in a mobile communication device. In particular, the smart card may provide a module for identifying and/or authenticating a subscriber towards a mobile communication network. For this purpose, the smart card may transmit identification and/or authentication data stored therein to the mobile communication network. This may be done after having authenticated the user in the smart card. The module may be implemented as a software module executed in the aforementioned microprocessor of the smart card.

A mobile communication device according to an exemplary embodiment may comprise a smart card of the type described herein.

When the smart card is included in the mobile communication device, it is preferably configured to issue a command to the mobile communication device or another entity connected to the mobile communication device in response to a processing of an acquired audio signal, the command being particularly used for unlocking a function of the device or entity. Possible further entities to which a command can be issued are servers connected to the mobile communication device through a communication network or entities which are directly connected to the mobile communication device.

In one exemplary embodiment of the invention, the smart card is configured to unlock the mobile communication device for connecting to a mobile communication network in response to the recognition of the user based on the voice sample. For unlocking the mobile communication device, the smart card may issue a command in response to the recognition of the user. In such an exemplary embodiment, the secure, voice-based user authentication process provided by the smart card can advantageously be used for unlocking the access to a mobile communication network.

In another exemplary embodiment of the invention, the smart card is configured to transmit to a service a confirmation that the user has been recognized based on the voice sample. The service may particularly be accessed through a mobile communication network using the mobile communication device. The exemplary embodiment allows a service to rely on the voice-based authentication process provided by the smart card.

Furthermore, in one exemplary embodiment of the invention, the smart card is configured to forward the audio signal to a communication network to which the mobile communication device is connected. In particular, the audio signal may be forwarded to a receiver through the mobile communication network. This allows establishing a voice communication through the mobile communication network using the microphone of the smart card. By encrypting the audio signal in the way described above the communication can be efficiently secured.

BRIEF DESCRIPTION OF THE DRAWINGS

The aforementioned and other aspects of the invention will be apparent from and elucidated with reference to the embodiments described hereinafter making reference to the following accompanying drawings.

DETAILED DESCRIPTION OF SPECIFIC EMBODIMENTS

Figure 1:
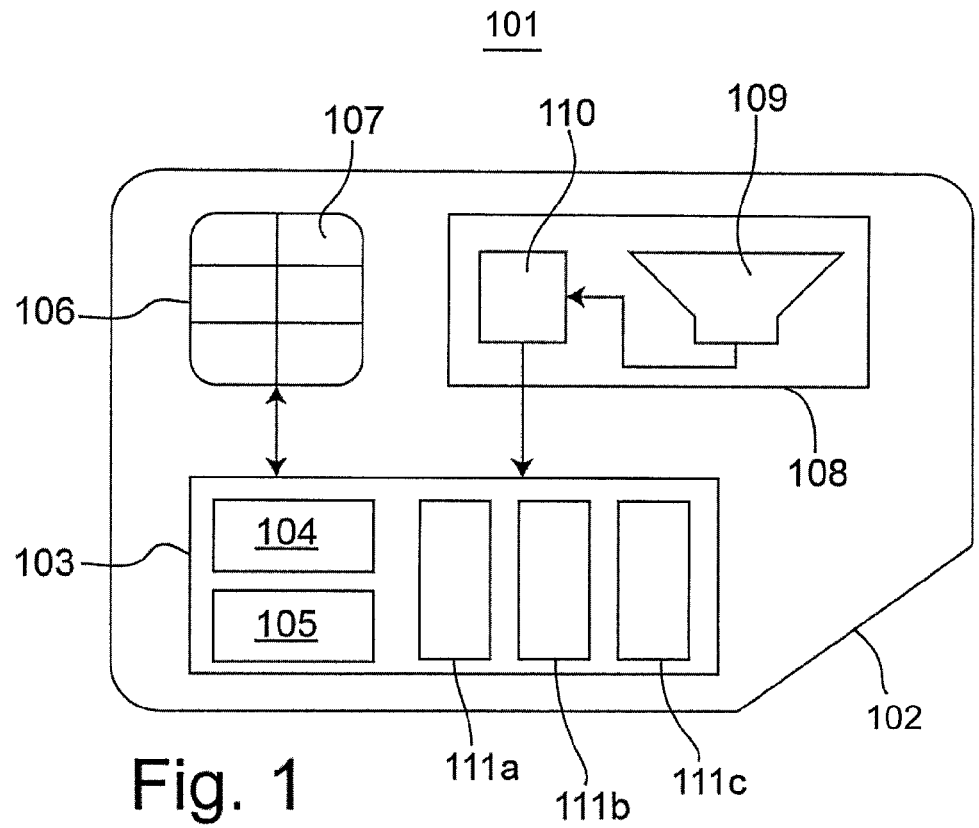
FIG. 1 is a block diagram of a smart card disposing of an audio module including a microphone.

FIG. 1 schematically depicts a smart card 101. The smart card 101 comprises a body 102 which may be made of polyvinyl chloride (PVC) or another plastic material. The shape of the body 102 may correspond to a standard form factor, which is selected according to the environment in which the smart card 101 is utilized. In particular, the dimensions of the body 102 of the smart card 101 may be adapted to the application environment such that the smart card 101 can be inserted into card reader units 202 provided in the intended application environment, if the smart card 101 is a contact card. If the smart card 101 is a contactless card, the shape of the body 102 may likewise correspond to a standard form factor.

Into the body 102, there is embedded an integrated circuit (IC) 103, which may particularly include a programmable microprocessor 104 and a storage 105 for storing programs that can be executed in the microprocessor 104. The storage 105 may include different memory units, such as volatile and non-volatile memory. In addition, the IC 103 may include further components which are not depicted in FIG. 1, such as, for example, one or more co-processor(s) and one or more controller(s) for certain functions of the IC 103, which are not integrated therein. In order to prevent tampering, the IC 103 disposes of a security architecture which prevents physical attacks of the smart card 101.

Figure 2:
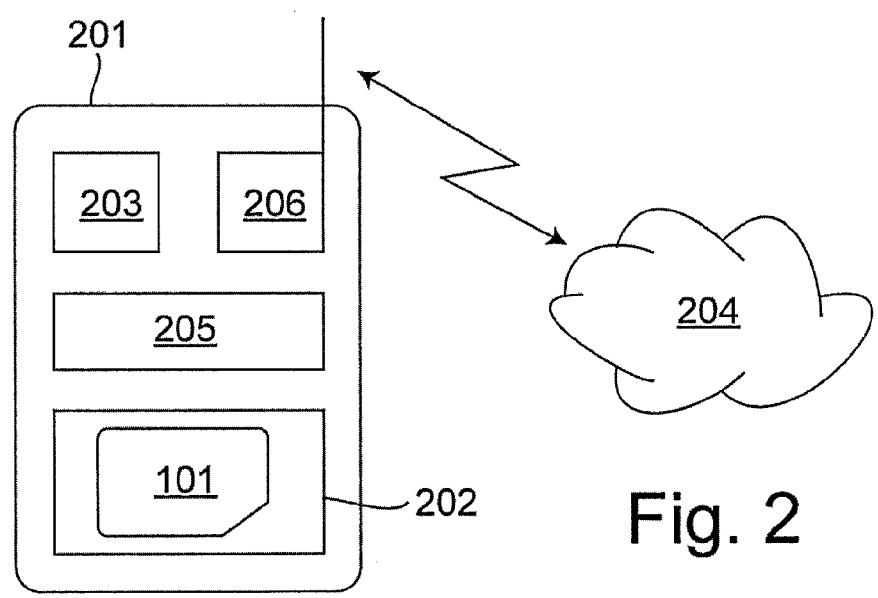
FIG. 2 is a block diagram of a mobile communication device including the smart card.

In the embodiment depicted in FIG. 1, the smart card 101 is configured as a contact card. Here, the IC 103 is coupled to a contact area 106 on the surface of the body 102. In one embodiment, the IC 103 is arranged at the backside of the contact area 106 within a recess or cavity in the body 102, which is covered by the contact area 106. The contact area 106 includes contact pads 107 which are contacted, when the smart card 101 is inserted into a card reader unit 202 of a device 201 (FIG. 2). Through the contact pads 107, the device 201 may particularly supply the electronic components of smart card 101 with power and may communicate with the smart card 101, i.e. exchange data with the microprocessor 104 and/or another component of the IC 103.

In an alternative embodiment, which is not depicted in the figures, the smart card 101 is configured as a contactless smart card 101. In this embodiment, the smart card 101 includes a radio interface instead of or in addition to the contact area 106. The radio interface is included in or coupled to the IC 103 and utilized for wirelessly exchanging data with the contactless smart card 101. The radio interface may allow for establishing a wireless communication connection between the smart card 101 and a device over certain distance. In particular, the communication may be a short range communication according to a corresponding communication standard, such as, for example, a standard based on ISO/IEC 14443.

Contactless smart cards 101 can be configured as passive cards which are supplied with power only by the radio frequency field generated by the device 201 in order to communication with the smart card 101. However, it is preferred that at least some components of the smart card 101 are supplied with power by a further power source, when it is a contactless card. This power source may be an internal power supply, such as, for example, a battery included in the body 102 of the smart card 101, or an external power supply which is connected to a contact element on the surface of the body 102 of the smart card 101.

In addition to the IC 103, the smart card 101 includes an audio module 108. The audio module 108 contains a microphone 109, i.e. an audio sensor for capturing acoustic signals. The microphone 109 comprises a transducer element which converts acoustic waves into electric signals and which may be configured in a way known to a person skilled in the art. In principle, any suitable transducer element may be utilized, if it allows providing a microphone 109 which is small enough in size to be embedded into the smart card 101. In particular, the transducer element may use electromagnetic induction, capacitance change, piezoelectric generation or light modulation to produce the electric signal. In addition to the transducer element, the microphone 109 may include a mounting of the transducer element and circuitry for generating an output signal of the microphone 109 from the electric signal of the transducer element. This may especially include an amplification of the transducer signal.

The microphone 109 is embedded into the body 102 of the smart card 101. In particular, the microphone 109 may be inserted into a cavity in the body 102, which may be separated from the cavity including the IC 103 or which may be same cavity. The transducer element of the microphone 109 may be arranged at an opening of the cavity at a surface of the body 102 of the smart card 101. The opening facilitates the penetration of acoustic waves into the cavity. In another embodiment, the material of the body 102 of the smart card 101 is able to conduct acoustic waves into the cavity so that an opening can be dispensed with. Within the cavity, the microphone 109 and possible further elements (see below) are inserted preferably in such a way that they cannot be unhinged and separated from the smart card 101 without destroying the smart card 101. For instance, this may be achieved by gluing and/or welding the elements and the body 102 of the smart card 101. In addition, the cavity may be closed with a covering that is irreversibly affixed to the body 102 of the smart card 101. Here, the opening may include one or more holes in the covering, or the covering is made from a sound-conducting material.

In one embodiment, the microphone 109 is sensitive to sound which approaches the microphone 109 from certain restricted dihedral angle. Preferably, the microphone 109 is arranged such that, the receiving area extends essentially laterally from the main surface of the smart card 101 which also includes the contact area 106, if the smart card 101 is a contact card, or from the opposite surface. In a further embodiment, the receiving area of the microphone 109 is symmetric in relation to the main plane of the smart card 101. In this embodiment, receiving areas extend essentially laterally from both main surfaces of the smart card 101.

In addition to the microphone 109, the audio module 108 may include further components assigned to the microphone 109. In particular, these components may include an analog-to-digital converter (ADC) 110. The ADC 110 may be connected to an output of the microphone 109 and may receive an analog audio signal provided by the microphone 109. This signal may be transformed into a digital audio signal by the ADC 110 for further processing of the signal. The ADC 110 may be located on a chip to which also the microphone 109 is (directly) connected and which may be separated from the chip of the IC 103 of the smart card 101. As an alternative, the microphone 109 and/or the ADC 110 may be included in the IC 103.

Furthermore, there may be components for processing the digital audio signal for providing functions related to the audio signal, some of which will be explained below. The components may be configured as hardware modules 111$i$ (I=a, b, c), particularly as digital signal processors (DSPS). By way of example, three hardware modules 111$i$ are depicted in FIG. 1. There may be one hardware module for each function of the smart card 101 that includes the processing of the digital audio signal. In a further embodiment, at least one hardware module is enabled to perform several such functions. The hardware modules 111$i$ may also be located on the separate chip of the audio module 108, or they may be integrated into the IC 103 of the smart card 101 as it is depicted in FIG. 1. The latter has the advantage that the hardware modules 111$i$ can be embedded into the security architecture which is already provided by the IC 103.

The hardware modules 111$i$ receive and process the digital audio signal from the ADC 110 in order to realize functions of the smart card 101 which are related to the audio signal. The results of the processing of the audio signal in the hardware modules 111$i$ may be passed to the microprocessor 104 to which the hardware modules 111$i$ are connected. In the microprocessor 104, functions may be activated in response to the results determined in the hardware modules 111$i$, and/or the results may be further processed in the microprocessor 104. Via the microprocessor 104, the results of the processing of the audio signal in the hardware modules 111$i$ may also be output to an external device, which is connected to the smart card 101. Furthermore, the microprocessor 104 may control the hardware modules 111i. In particular, the microprocessor 104 may be capable of activating the hardware modules 111i, i.e. to command individual hardware modules 111i to execute a function provided by the hardware module 111i.

As an alternative to the implementation of functions in one or more hardware modules 111i, at least one of the functions related to the audio signal may be provided by a software module which is executed in the microprocessor 104 of the IC 103 of the smart card 101. For this purpose, the microprocessor 104 receives the digital audio signal in order to process this signal within the scope of the functions related thereto. The execution of one or more functions in the microprocessor 104 has the advantage that a greater level of integration is achieved and less hardware parts are required. However, by providing a hardware module 111i for certain function(s), specialized hardware can be provided for certain task such as speaker or speech recognition, which is better adapted to the task than the microprocessor 104 and which unloads the microprocessor 104 from the task.

In one embodiment, there may be at least one further hardware component connected between the ADC 110 and the component(s) for executing the audio-related functions of the smart card 101. Especially, tasks that are common for various functions may be executed in such further hardware component which is not shown in FIG. 1. In particular, the hardware component may be responsible for time encoded signal processing and recognition and/or for a Fourier transformation of the audio signal, particular a fast Fourier transformation.

One function which may be executed in a hardware module 111i or in the microprocessor 104 may be a so-called speaker recognition based on an audio sample of a user which is captured by the microphone 109. This function may be used for authenticating a user of the smart card 101, i.e. to confirm the identity of the user. Such a voice-based authentication takes advantage of the fact that the voice or characteristics thereof is a unique biometric feature of a person, which is almost impossible to be copied exactly by another person.

In one embodiment, a so-called text dependent speaker recognition or verification is performed. Compared with a text independent recognition, which is also possible, in principle, the text dependent speaker recognition has the advantage to be less resource-consuming.

For preparing the (text dependent) speaker recognition function, the user may give a voice sample once. This voice sample includes a predetermined text, which is also spoken by the user, when her identity is to be verified. From the voice sample, characteristics are extracted which are combined to form a voice print or voice model. The voice print may be stored in the smart card 101, particularly in the storage 105. The voice print may be generated by the speaker recognition function of the smart card 101 based on a voice sample acquired by the microphone 109. However, it is likewise possible that the voice print is generated externally and forwarded to the smart card 101 for being stored therein.

When the identity of the user is to be verified, the user speaks the predetermined text and his voice is captured by the microphone 109. In one embodiment, the user is requested to give this voice sample through a user interface 203 of a device 201 the smart card 101 is inserted in. The request may be given optically and/or acoustically, for example. For instance, the request may be made, when the user whishes to activate a protected function of the device 201 and/or the smart card 101. When the user gives the voice sample, the audio signal of the voice sample is recorded with the microphone 109 and the speaker recognition function extracts from the recorded voice sample the features which are compared to the voice print. The extracted features correspond to the characteristics which are included in the voice print. The comparison is made using a pattern-matching method, such as, for example, dynamic time warping or a hidden Markov model. If the comparison leads to a match between the features of collected voice sample and the voice print, the identity of the user is confirmed. Otherwise, the user authentication has an unsuccessful result.

The speaker recognition function may forward the result of the comparison, i.e. the result of the user authentication, to a further function or module of the smart card 101 and/or the device 201 the smart card 101 is connected to. In particular, the result may be forwarded to the function which requested the authentication of the user. In response to the result, the function may be activated or unlocked (in case the user authentication is successful) or locked (in case the user authentication is unsuccessful). For instance, as a result of a successful user authentication, the smart card 101 or certain function(s) thereof may be unlocked for access through a device 201 the smart card 101 is inserted in or the execution of a financial or other transaction involving the smart card 101 and/or the device 201 may be allowed. Further examples of utilizations of the user authentication result will be explained below.

A further function which may be executed in a hardware module 111i or in the microprocessor 104 of the smart card 101 may be a speech recognition function, which may allow the user to enter commands and/or further input via speech. The user may perform the speech unit upon a request or after having activated the speech recognition function. The request may be given and/or the activation may be made using the user interface 203 of the device 201 the smart card 101 is inserted in, for example. The speech input is captured using the microphone 109 and the audio signal generated from the speech unit is recorded and processed by the speech recognition function in order to recognize the words spoken by the user. In the process, the speech recognition function may recognize words by matching the audio signal or features extracted therefrom to a dictionary by applying a pattern-matching method, such as a hidden Markov model.

In one embodiment, the dictionary includes predetermined commands for controlling the smart card 101 or an application executed in the smart card 101. Likewise, the dictionary may include commands for controlling the device 201 the smart card 101 is connected to and/or applications executed therein. When the speech recognition function has recognized one of the commands, it may notify the function or application to which the command is assigned. Thereupon, the command will be executed. Thus, the user can control the smart card 101 and/or the device 201 including the smart card 101 using voice commands.

It is likewise possible that the speech recognition function also recognizes a multitude of words of certain language thereby allowing the user to enter free text using speech. The recognized text may be provided to further applications of the smart card 101 and/or the device 201 connected to the smart card 101. Such application may be used for entering and/or editing text, such as, for example, a text of a message to be sent using the device 201.

The aforementioned and further applications for utilizing the audio signal captured with the microphone 109 of the smart card 101, particularly the audio signal of the users voice, will also be discussed below in connection with the following description of one embodiment of the smart card 101.

In this embodiment, the smart card 101 is configured for use in a mobile communication device 201. Particularly, the smart card 101 may provide functions for accessing services of a mobile communication network 204 to which the mobile communication device 201 is connected. One of these functions includes the identification and/or authentication of a subscriber or a subscription to which the smart card 101 is assigned towards the mobile communication network 204.

The aforementioned functions may be provided by an application which is executed in the microprocessor 104 of the smart card 101. In different embodiments, the application may be configured as a Subscriber Identity Module (SIM) application and/or a universal Subscriber Identity Module (USIM) according to the corresponding specifications of the 3rd Generation Partnership Project (3GPP). Such applications are particularly provided for accessing services of networks which are configured as Global System for Mobile Communications (GSM) and/or Universal Mobile Telecommunications System (UMTS). Likewise, the application may be configured according to another mobile telecommunication standard.

The mobile communication device 201 may be configured as a mobile telephone, a personal data assistant (PDA), a notebook computer or as a similar device. It disposes of at least one processor 205 and may for executing applications and controlling the functions of the mobile communication device 201. Moreover, a user interface 203 may be provided for interacting with the user. The user interface 203 may be connected to the processor 205 include a display unit for visual outputs and a keyboard or other device for receiving inputs of the user. Moreover, a loudspeaker and/or microphone may be included in the user interface 203, the microphone being independent from the microphone 109 of the smart card 101.

For connecting to the mobile communication network 204, the mobile communication device 201 may include a radio module 206, which may particularly be controlled by the processor 205. The smart card 101 is preferably removably inserted into a card reader unit 202 of the mobile communication device 201. The card reader unit 202 disposes of contact elements which contact the contact pads 107 of the contact area 106 of the smart card 101 in order to exchange data with the smart card 101 and to supply the smart card 101 with power. Via the card reader unit 202, the smart card 101 may communicate with the processor 205 and—through the radio module 206—with the mobile communication network 204.

The radio module 206 and the card reader unit 202 may be essentially fixedly integrated into the mobile communication device 201 as it is usually the case in a mobile telephone, for example. In another embodiment, the radio module 206 and the card reader unit 202 may be included in an add-on module which is removably connected to the mobile communication device 201. For instance, these elements may be comprised in a Universal Serial BMS (USB) device which is connected to a notebook computer.

In order to facilitate the capturing of sound by the microphone 109 of the smart card 101, there may be a hole or tunnel extending from a surface of the mobile communication device 201 to the smart card 101. Through this hole, the sound may be guided to the microphone 109 of the smart card 101. In a mobile telephone, the smart card 101 may be located in the battery compartment between the battery pack and a front of the telephone, which may also include a keypad of the telephone. In such a configuration, the hole may extend from the front of the telephone to the smart card 101. If the smart card 101 is inserted into an add-on module, this module may dispose of a suitable hole extending from the module's surface to the smart card 101. As an alternative to the hole or tunnel, the mobile communication device 201 may include a sound-conducting material between its surface and the smart card 101 in order to facilitate the capturing of sound in the microphone 109.

Before the mobile communication device 201 is attached to the mobile communication network 204, the user of the mobile communication device 201 may be authenticated in the smart card 101. The authentication may be done, when the mobile communication device 201 is turned on and/or when the add-on module including the radio module 206 is activated. Utilizing the speaker recognition function of the smart card 101, the user authentication is preferably done based on a voice sample of the user. Such user authentication could replace the user authentication based on a personal identification number (PIN) which is usually made in the smart cards 101 according to the state of the art.

Preferably, text dependent speaker recognition is executed for authenticating the user. Thus, the user is requested through the user interface 203 to speak the predetermined text which is captured by the microphone 109 of the smart card 101. Based on the recorded voice sample, the speaker recognition unit authenticates the user successfully or not in a way already described before. If the user authentication is successful, the smart card 101 may proceed to attach the mobile communication device 201 to the mobile communication network 204. Furthermore, the smart card 101 may allow access to further functions or data stored therein after the user has been authenticated successfully. In addition, the processor 205 of the mobile communication device 201 may block access to functions of the mobile communication device 201 unless it receives from the smart card 101 a notification or command that the user has been authenticated successfully.

In addition or as an alternative, the speaker recognition function of the smart card 101 may be used to authenticate the user, when she accesses a service through the mobile communication network 204. The service may by a web service, which is accessed through a computer network, such as the Internet, to which the mobile communication device 201 is connected via the mobile communication network 204, or the service may be a telephone service which is accessed via the mobile communication network 204 and optionally another telephone network to which the mobile communication network 204 is connected. The service may particularly be directed to financial transactions or to governmental transactions, which require a high degree of security. However, the speaker recognition function may also be utilized for user authentication in other services.

When the service requires a user authentication for executing a protected function, it sends a corresponding request to the mobile communication device 201. Within the mobile communication device 201, the request is forwarded to the smart card 101, particularly to the speaker recognition function of the smart card 101. The user is requested to speak a predetermined text, which is captured by the microphone 109 of the smart card 101 and processed by the speaker recognition function. The predetermined text may correspond to the aforementioned text for authenticating the user to access the mobile communication network 204. Likewise, another text may be provided, particularly the text may be uniquely assigned to the service. In the speaker recognition function, the captured audio signal of the text is compared against the voice print of the predetermined text. If the comparison yields a match, a message is transmitted from the smart card 101 to the service notifying the service that the user has been authenticated successfully. Thereupon, the service may grant access to the protected function. If there is no match between the audio signal and the voice print, the smart card 101 notifies the service that the user authentication failed, and the service may deny access to the protected function. The communication between the service and the smart card 101 may be carried out through the mobile communication device 201 and the mobile communication network 204 and may be secured. The security may particularly be achieved with cryptographic methods, which are, in principle, known to a person skilled in the art.

The already described speech recognition function of the smart card 101 may be utilized to control functions of the mobile communication device 201 and/or the smart card 101. When the user pronounces one command of a predetermined set of commands, the speech recognition function may recognize the command. Thereupon, it may activate a function of the mobile communication device 201 and/or the smart card 101. The predetermined set of commands are included in a dictionary of the smart card 101, which may also include further words in certain language. In addition or as an alternative, the dictionary may include names stored in an address book of the mobile communication device 201. The additional words and names may allow a user not only to activate certain function, but he may also give details how the function is to be executed.

In one embodiment, the user may pronounce the command and/or further speech input after having activated the speech recognition function using the user interface 203 of the mobile communication device 201. In a further embodiment, the speech recognition function is essentially permanently active, when the smart card 101 is turned on.

In one implementation, there is provided a command for starting a call to a communication partner. When the speech recognition function recognizes this command, it controls the establishment of the call. In the process of establishing the call, the user may be requested to enter the phone number of the communication partner using the user interface 203 of the mobile communication device 201. As an alternative, the user may also input a phone number or the communication partner via speech, and the phone number is recognized by the speech recognition function. In this embodiment, the dictionary preferably includes the numbers in the user's language. In a further embodiment, the user may pronounce a name which is stored in the address book of the mobile communication device 201. Here, the speech recognition function recognizes a pronounced name and the call may be established using the phone number allocated to the recognized name in the address book. For enabling the speech recognition function to recognize the name, the names in the address book may be included in the function's dictionary.

In addition or as an alternative to the aforementioned function, the smart card 101 may include a communication function. The communication function forwards the audio signal captured by the microphone 109 via the mobile communication network 204 to a recipient. In one embodiment, the audio signal may be transmitted via a circuit switched connection. In another embodiment, the audio signal is transmitted using a packet switched connection between the mobile communication device 201 and the recipient. The recipient may be specified by the user of the mobile communication device 201 using the user interface 203 or the speech recognition function, as described before.

The communication function particularly allows establishing a voice connection, when the mobile communication device 201 does not dispose of a further microphone 109. This may be the case, for example, if the mobile communication device 201 is a notebook computer, which itself does not have a built-in or connected microphone (a loudspeaker is often present with such computer so that the audio signal received from the user's communication partner can be output). In a further embodiment, the smart card 101, particularly an application executed in the smart card 101, encrypts the audio signal before it is forwarded to the mobile communication network 204. The encryption may be made in such a way that (only) the recipient can decrypt the audio signal. In particular, the audio signal may be encrypted using a secret key, which is shared between the smart card 101 and the recipient and which may be specific to the call (i.e. which may be a so-called session key). In particular, the key may be negotiated between the smart card 101 and the recipient, when the communication between the smart card 101 and the recipient is established.

The recipient may also encrypt audio signals which are transmitted to the mobile communication device 201. The received audio signals may be decrypted in the smart card 101 before they are played back using a loudspeaker of the mobile communication device 201, which may be contained in the user interface 203.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In particular, the invention may also be implemented in other smart cards 101 than a smart card 101 for use in a mobile communication device 201, which has been described before in greater detail. For instance, a microphone 109 and one or more functions for processing the audio signals captured with the microphone 109 may be included in banking cards or other financial transactions cards. Here, a speaker recognition function may allow or block the execution of a financial transaction based on the result of a voice-based user verification, which may be executed in a way described before, before the transaction is started. It may also be possible, to implement a speaker recognition function of the type described before in a memory card for controlling access to the data stored therein or to a card for authenticating a user or subscriber in other environments than in mobile communications.

In the claims, the word "comprising" does not exclude other elements or steps, and the indefinite article "a" or "an" does not exclude a plurality. A single processor or other unit may fulfill the functions of several items recited in the claims. Any reference signs in the claims should not be construed as limiting the scope.

What is claimed is:

1. A smart card for a mobile device, comprising:
   a microphone for capturing an audio signal, wherein the microphone is inserted into a cavity of a body of the smart card, and wherein:
   (a) a material of the body of the smart card is able to conduct acoustic waves; and
   (b) the cavity comprises an opening that is closed with an additional covering irreversibly affixed to the body of the smart card, and the additional covering is made of sound-conducting material to dispense an opening in the covering, the sound-conducting material being disposed between a surface of the mobile device and the smart card; and
   at least one processor for processing the audio signal.

2. The smart card recited in claim 1, wherein the microphone is non-detachably connected to the smart card.

3. The smart card recited in claim 1, wherein the processor is configured to recognize a user using a voice sample of the user captured by the microphone.

4. The smart card recited in claim 3, wherein the processor is configured to compare the captured audio signal to reference information stored therein.

5. The smart card recited in claim 1, wherein the processor is configured to determine that an audio input captured by the microphone corresponds to a predetermined command and to control an activation of a function assigned to the predetermined command.

6. The smart card recited in claim 5, wherein the predetermined command is included in a set of predetermined commands stored in the smart card.

7. The smart card recited in claim 1, wherein the processor is configured to forward the audio signal to a receiver external to the smart card.

8. The smart card recited in claim 1, wherein the processor is configured to encrypt the audio signal before it is forwarded.

9. The smart card recited in claim 1, comprising at least two processors for processing the audio signal, each processor being configured as a separate hardware module.

10. A mobile telephone comprising a smart card, wherein the smart card includes a microphone for capturing an audio signal, and at least one processor for processing the audio signal, wherein the mobile telephone comprises a battery compartment and the smart card is located between a battery pack and a front of the mobile telephone, wherein the mobile telephone comprises a hole or a tunnel extending from a surface of the mobile telephone to the smart card and a sound conducting material between the surface of the mobile telephone and the smart card for capturing the audio signal by the microphone, wherein the smart card further provides functions for accessing services of a mobile communication network.

11. The mobile communication device recited in claim 10, wherein the smart card is configured to issue a command to the mobile telephone or an entity connected to the mobile telephone in response to a processing of an acquired audio signal, the command being particularly used for unlocking a function of the mobile communication device or entity.

12. The mobile telephone recited in claim 10, wherein the smart card is configured to unlock the mobile telephone for connecting to the mobile communication network in response to the recognition of the user based on the voice sample.

13. The mobile telephone recited in claim 10, wherein the smart card is configured to transmit to a service a confirmation that the user has been recognized based on the voice sample.

14. The mobile communication device recited in claim 10, wherein the smart card is removable inserted into the mobile communication device, wherein the smart card is a SIM card or a USIM card.

15. A mobile communication device comprising a smart card, wherein the smart card includes a microphone for capturing an audio signal, and at least one processor for processing the audio signal, wherein the mobile communication device comprises a battery compartment ad the smart card is located between a battery pack and a front of the mobile communication device wherein the mobile communication device comprises a hole or tunnel extending from a surface of the mobile communication device to the smart card and a sound conducting material between the surface of the mobile communication device and the smart card for capturing the audio signal by the microphone, wherein the smart card further provides functions for accessing services of a mobile communication network.

\* \* \* \* \*